(12) United States Patent
Yoo (10) Patent No.: US 11,133,726 B2
(45) Date of Patent: Sep. 28, 2021

(54) GEARBOX AND ACTUATOR (71) Applicant: LG INNOTEK CO., LTD., Seoul (KR)

(72) Inventor: Byeong Jong Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/640,589

(22) PCT Filed: Aug. 7, 2018

(86) PCT No.: PCT/KR2018/008920
§ 371 (c)(1),
(2) Date: Feb. 20, 2020

(87) PCT Pub. No.: WO2019/039770
PCT Pub. Date: Feb. 28, 2019

(65) Prior Publication Data
US 2020/0204036 A1    Jun. 25, 2020

(30) Foreign Application Priority Data

Aug. 21, 2017    (KR) .......... 10-2017-0105392

(51) Int. Cl.
*H02K 7/10*    (2006.01)
*H02K 7/08*    (2006.01)
(Continued)

(52) U.S. Cl.
CPC .......... *H02K 7/116* (2013.01); *F16H 57/023* (2013.01); *H02K 7/08* (2013.01); *F16C 2361/61* (2013.01);
(Continued)

(58) Field of Classification Search
CPC .......... H02K 7/083; H02K 7/116; H02K 7/08; F16H 57/021; F16H 57/023;
(Continued)

(56) References Cited

U.S. PATENT DOCUMENTS 2,827,798 A * 3/1958 Lucia .................. F16H 1/22
74/410
3,802,289 A * 4/1974 Cheek ................ F16H 57/021
74/411.5
(Continued)

FOREIGN PATENT DOCUMENTS

EP    1 177 929 A2    2/2002
EP    2 310 220         4/2011
(Continued)

*Primary Examiner* — Adam D Rogers
(74) *Attorney, Agent, or Firm* — Birch, Stewart, Kolasch & Birch, LLP (57) ABSTRACT

One embodiment relates to a gearbox and an actuator comprising same, the gearbox comprising: a housing having an opening; a cover arranged at the opening; a first gear part arranged so that one side thereof is supported by the housing, and the other side thereof is supported by the cover; and a second gear part and a third gear part arranged so that the first gear part is interposed therebetween. The first gear part comprises: a first shaft arranged so that one side thereof is supported by the housing, and the other side thereof is supported by the cover; a bearing arranged on the outer side of the first shaft; and a first gear arranged on the outer side of the bearing.

12 Claims, 8 Drawing Sheets

(51) Int. Cl.
*F16H 57/02* (2012.01)
*H02K 7/116* (2006.01)
*F16H 57/023* (2012.01)
*F16D 121/24* (2012.01)
*F16H 57/021* (2012.01)

(52) U.S. Cl.
CPC ........ *F16D 2121/24* (2013.01); *F16H 57/021* (2013.01); *H02K 7/083* (2013.01)

(58) Field of Classification Search
CPC ....... F16H 2057/02043; F16C 2361/61; F16D 2121/24
See application file for complete search history.

(56) References Cited

U.S. PATENT DOCUMENTS

| | | | | |
|---|---|---|---|---|
| 4,414,890 | A * | 11/1983 | Schiel | D21G 1/0006 100/162 B |
| 5,682,799 | A * | 11/1997 | Dimov | F16H 1/22 74/606 R |
| 7,410,442 | B2 * | 8/2008 | Fox | F16C 33/605 475/343 |
| 7,490,695 | B2 * | 2/2009 | Segawa | F16C 27/066 180/444 |
| 8,668,620 | B2 * | 3/2014 | Ishida | F16C 35/067 475/333 |
| 9,371,900 | B2 * | 6/2016 | Handa | F16H 57/021 |
| 9,452,773 | B2 * | 9/2016 | Sato | B62D 5/0421 |
| 9,840,141 | B2 * | 12/2017 | Ooki | B60K 5/04 |
| 9,943,939 | B2 * | 4/2018 | Saur | B25F 5/001 |
| 10,060,509 | B2 * | 8/2018 | Liang | H02K 7/116 |
| 2009/0046973 | A1 * | 2/2009 | Lee | F16C 35/067 384/572 |
| 2009/0308698 | A1 | 12/2009 | Park | |
| 2012/0325601 | A1 | 12/2012 | Giering | |
| 2015/0210253 | A1 | 7/2015 | Qi et al. | |
| 2018/0118023 | A1 * | 5/2018 | Makino | F16H 1/06 |

FOREIGN PATENT DOCUMENTS

| | | |
|---|---|---|
| KR | 10-2009-0064174 A | 6/2009 |
| KR | 10-2009-0130602 A | 12/2009 |
| KR | 10-2010-0132808 A | 12/2010 |

* cited by examiner

[FIG. 1]

Prior Art

GEARBOX AND ACTUATOR

CROSS REFERENCE TO RELATED APPLICATIONS

This application is the National Phase of PCT International Application No. PCT/KR2018/008920, filed on Aug. 7, 2018, which claims priority under 35 U.S.C. 119(a) to Patent Application No. 10-2017-0105392, filed in the Republic of Korea on Aug. 21, 2017, all of which are hereby expressly incorporated by reference into the present application.

TECHNICAL FIELD

The present invention relates to a gearbox and an actuator including the same.

BACKGROUND ART

In a case in which a vehicle is parked, a parking brake is operated to restrict movement of the vehicle.

An electronic parking brake (EPB) is used as the parking brake, and the EPB is an apparatus configured to electrically control operation of the parking brake. The EPB is installed in a general disc brake and performs a function of the parking brake. In order to operate the EPB, a separate actuator is required.

The actuator of the EPB includes a motor and a gearbox. In this case, the gearbox converts a final output to a large load.

Figure 1:
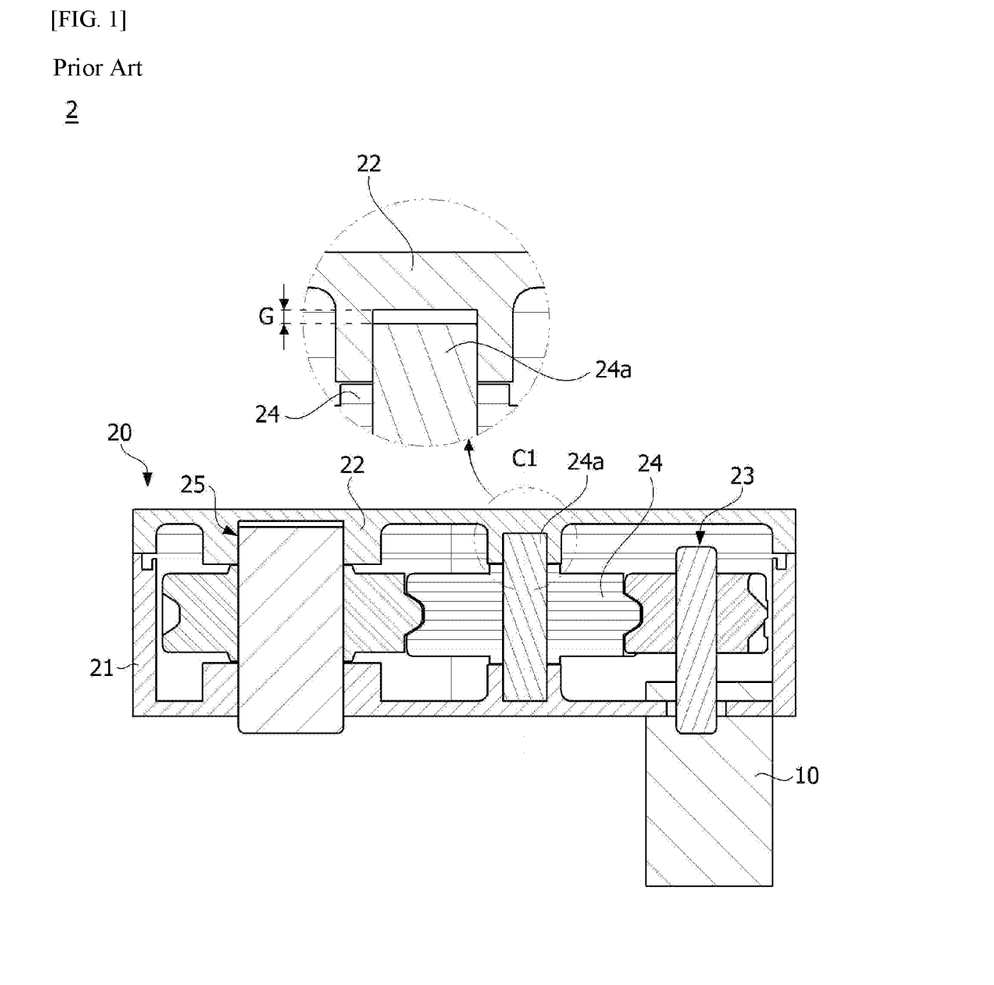
FIG. 1 is a view illustrating a conventional actuator.

Referring to FIG. 1, a conventional actuator 2 may include a motor 10 and a gearbox 20. In addition, the gearbox 20 may include a housing 21, a cover 22, a pinion gear 23, an idle gear 24, and a final gear 25.

In this case, in the idle gear 24, one end of a shaft 24a is press-fitted into the housing 21, and the idle gear 24 is slidingly coupled to the shaft 24a. In addition, the cover 22 is disposed at the other end of the shaft 24a. In this case, the cover 22 may be coupled to the other end of the shaft 24a through a press-fitting method.

As illustrated in FIG. 1, a gap G may be formed between the cover 22 and the other end of the shaft 24a.

As the motor 10 is driven, movement of the idle gear 24 occurs due to the gap G, and noise is generated at the actuator 2 due to the movement.

In addition, as the motor 10 is driven, the idle gear 24 moves in an axial direction C1 of the shaft 24a due to thrust. For example, the idle gear 24 moves upward due to the thrust. Accordingly, misalignment may occur between the pinion gear 23 and the idle gear 24 and between the final gear 25 and the idle gear 24.

In addition, the misalignment causes a problem of decreasing a durability lifespan of the gearbox 20. In addition, the misalignment may further generate a quality problem with relation to noise.

Technical Problem

The present invention is directed to providing a gearbox capable of improving axial alignment using a bearing and an actuator including the same.

Objectives that should be solved according to embodiments are not limited to the above described objectives, and other objectives which are not described above will be clearly understood by those skilled in the art from the following specification.

Technical Solution

One aspect of the present invention provides a gearbox including a housing in which an opening is formed, a cover disposed on the opening, a first gear part in which one side is supported by the housing and the other side is supported by the cover, and a second gear part and a third gear part with the first gear part disposed therebetween, wherein the first gear part includes a first shaft in which one side is supported by the housing and the other side is supported by the cover, a bearing disposed outside the first shaft, and a first gear disposed outside the bearing.

The first gear may include a main body, first gear teeth formed on an outer circumferential surface of the main body, and a first protrusion which protrudes from an inner circumferential surface of the main body, wherein one region of the bearing may be disposed on the first protrusion.

The gear teeth may be disposed at a predetermined angle $\theta$ with respect to a virtual line L vertically passing through the outer circumferential surface of the main body.

The bearing may include an inner wheel disposed outside the first shaft, the outer wheel disposed inside the first gear, and a ball disposed between the inner wheel and the outer wheel, and the first protrusion may be supported by the outer wheel.

The first shaft may be fixed between the housing and the cover.

The first shaft may be rotatably disposed between the housing and the cover.

The bearing may be coupled to the inner circumferential surface of the main body through a press-fitting method.

The first gear may also include a main body, first gear teeth formed on an outer circumferential surface of the main body, and a first protrusion and a second protrusion which are spaced apart from each other and protrude from an inner circumferential surface of the main body, wherein one region of the bearing may also be disposed between the first protrusion and the second protrusion.

The bearing may include an inner wheel disposed outside the first shaft, an outer wheel disposed inside the first gear, and a ball disposed between the inner wheel and the outer wheel, wherein the first protrusion may be disposed below the outer wheel, and the second protrusion may be disposed above the outer wheel.

The bearing may be disposed in the first gear through an insert injection method.

Another aspect of the present invention provides an actuator including a gearbox, and a motor disposed at one side of the gearbox, wherein the gearbox includes a housing in which an opening is formed, a cover disposed on the opening, a first gear part in which one side is supported by the housing and the other side is disposed by the cover, and a second gear part and a third gear part with the first gear part disposed therebetween, the first gear part includes a first shaft in which one side is supported by the housing and the other side is supported by the cover, a bearing disposed outside the first shaft, and a first gear disposed outside the bearing, and, when the second gear part is rotated by the motor, the first gear part and the third gear part rotate by operating in conjunction with the second gear part.

The first gear may include a main body, first gear teeth formed on an outer circumferential surface of the main body, and a first protrusion which protrudes from an inner circumferential surface of the main body, wherein one region of the bearing may be disposed on the first protrusion.

The first shaft and the bearing may be used to form a bearing assembly, and the first gear may be disposed in the bearing assembly through a press-fitting method to form the first gear part.

The first gear may include a main body, first gear teeth formed on an outer circumferential surface of the main body, and a first protrusion and a second protrusion which are spaced apart from each other and protrude from an inner circumferential surface of the main body, wherein one region of the bearing may be disposed between the first protrusion and the second protrusion.

The bearing and the first gear may be formed as a gear assembly through an insert injection method, and the first shaft may be coupled to an inner circumferential surface of the bearing of the gear assembly through a press-fitting method to form the first gear part.

Advantageous Effects

According to embodiments, a gearbox and an actuator including the same can improve axial alignment using a bearing so as to minimize noise and improve a durability lifespan of a gear.

That is, in the gearbox, since the bearing is disposed in a first gear part used as an idle gear, rotation of a first gear can be secured and movement of a first shaft can also be prevented.

In addition, since only the first gear rotates using the bearing, axial misalignment of the first shaft can be prevented.

Useful advantages and effects of the embodiments are not limited to the above-described contents and will be more easily understood while the specific embodiments are described.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In a case in which any one element is described as being formed or disposed "on or under" another element, such a description includes both cases in which the two elements are formed or disposed to be in direct contact with each other and one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described below in detail with reference to the accompanying drawings. Components that are the same or correspond to each other will be denoted by the same reference numerals regardless of the figure numbers, and redundant descriptions will be omitted.

Figure 2:
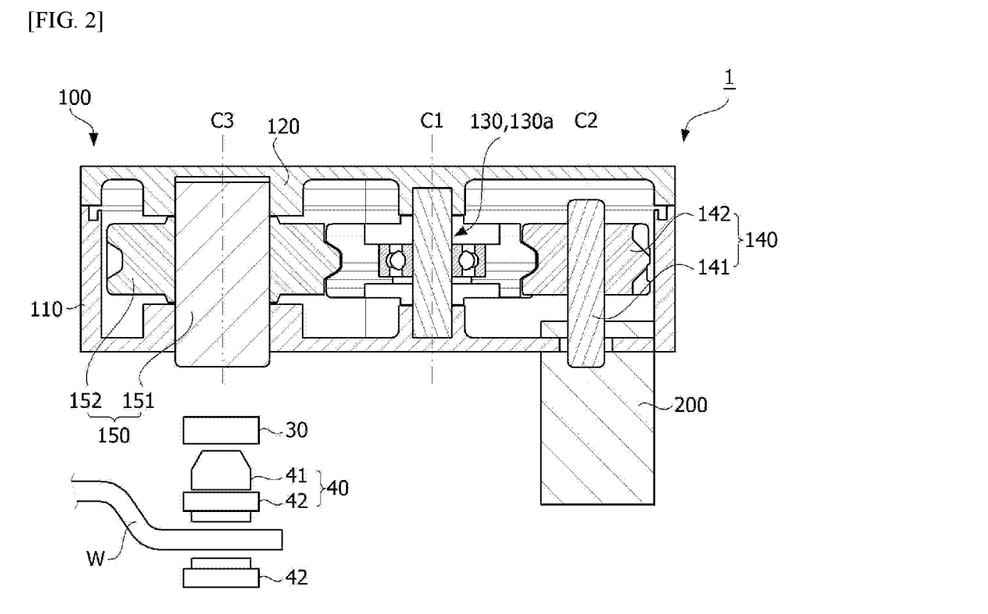
FIG. 2 is a view illustrating an actuator according to an embodiment.

FIG. 2 is a view illustrating an actuator according to an embodiment.

Referring to FIG. 2, an actuator 1 according to the embodiment may include a gearbox 100 and a motor 200 according to the embodiment. As illustrated in FIG. 2, the motor 200 may be disposed on one side of the gearbox 100.

The actuator 1 may be used in an electronic parking brake (EPB).

Referring to FIG. 2, the EPB may include the actuator 1, a linear moving part 30 configured to linearly move for moving forward or backward, and a caliper 40 installed to cover a wheel disc W installed in a vehicle. In this case, the caliper 40 may include a piston 41 and a pair of pads 42 with the wheel disc W disposed therebetween.

As an electronic control unit (ECU) transmits a braking signal to the motor 200 of the actuator 1, the gearbox 100 converts a rotating force applied from the motor 200 and transmits an output torque to the moving part 30. In addition, the moving part 30 moves the piston 41 of the caliper 40. Accordingly, the piston 41 presses one side of the wheel disc W using any one of the pads 42 to secure a braking force. In this case, the braking force may be a force for maintaining braking for parking of the vehicle.

Referring to FIG. 2, the gearbox 100 may include a housing 110, a cover 120, a first gear part 130 or 130a, a second gear part 140, and a third gear part 150. In this case, the first gear part 130 or 130a may be disposed between the second gear part 140 and the third gear part 150, and gear teeth of the first gear part 130 or 130a may be engaged with the gear teeth of the second gear part 140 and the third gear part 150.

In this case, the second gear part 140 may be rotated by the motor 200. Accordingly, the first gear part 130 or 130a and the third gear part 150 may be rotated by operating in conjunction with the second gear part 140.

The housing 110 and the cover 120 may form an exterior of the gearbox 100.

The housing 110 may be formed to have a container shape in which an opening is formed in an upper portion thereof. In addition, the cover 120 may be formed to cover the opening.

The housing 110 may be coupled to the cover 120 so that an accommodation space may be formed therein. In addition, the first gear part 130, the second gear part 140, and the third gear part 150 may be disposed in the accommodation space as illustrated in FIG. 2.

As illustrated in FIG. 2, one side of the first gear part 130 or 130a according to the embodiment may be supported by the housing 110, and the other side may be supported by the cover 120.

In this case, since the first gear part 130 or 130a may be provided as one assembly, one side of the first gear part 130 or 130a may be coupled to the housing 110 through a press-fitting method and the cover 120 may be press-fitted to the other side of the first gear part 130 or 130a so that the first gear part 130 or 130a may be disposed in the accommodation space.

Accordingly, since the first gear part 130 or 130a is provided as the assembly, an assembly process may be simplified, and thus, productivity can be improved. In addition, an assembly tolerance is minimized due to the first gear part 130 or 130a provided as the assembly, and thus, quality of the actuator 1 can be improved. In this case, the first gear part 130 or 130a may be provided as an idle gear.

Figure 3A:
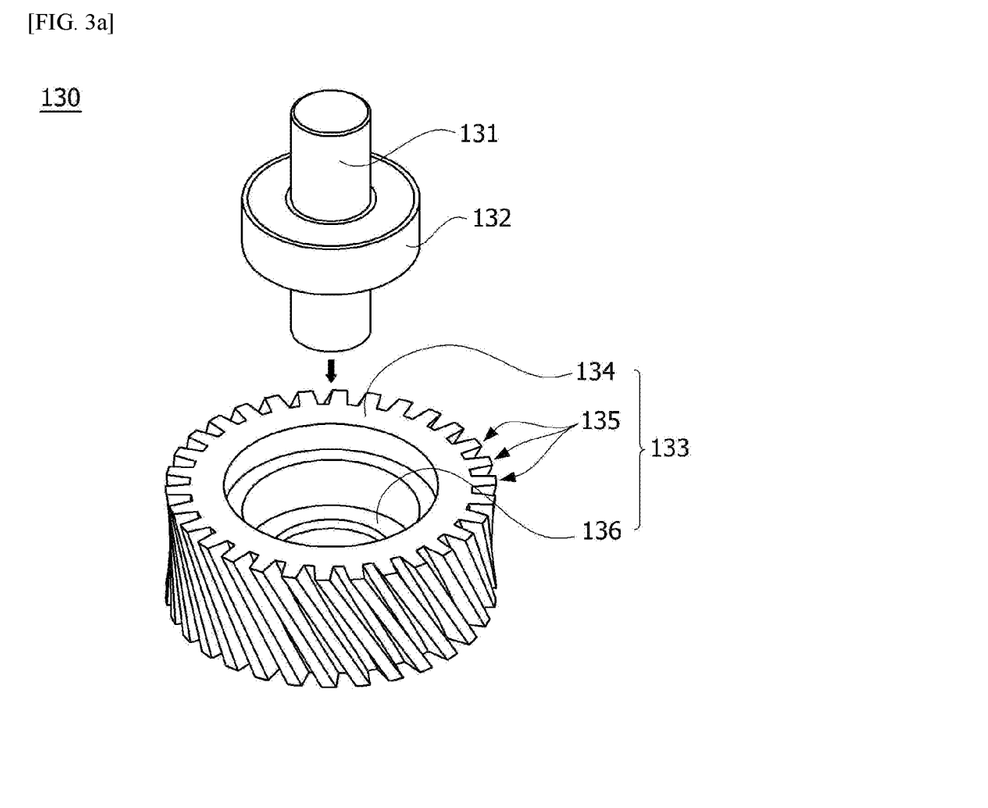
FIG. 3a is an exploded perspective view illustrating a first gear part disposed in the actuator according to a first embodiment.
Figure 3B:
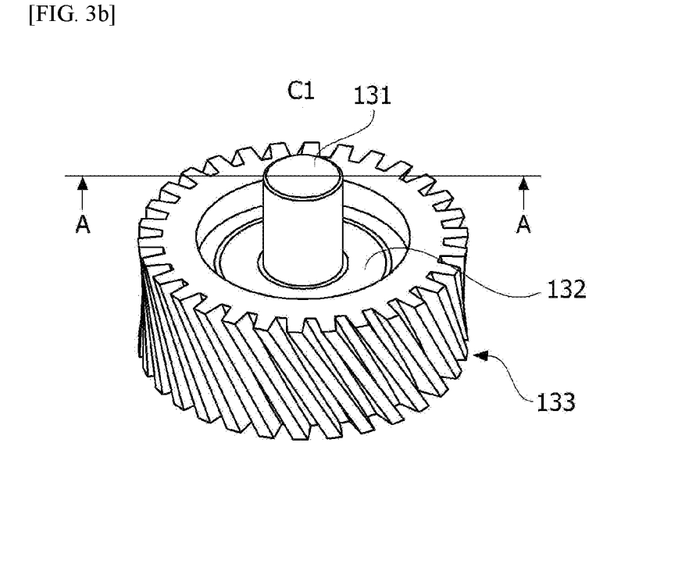
FIG. 3b is a perspective view illustrating the first gear part according to the first embodiment.
Figure 4:
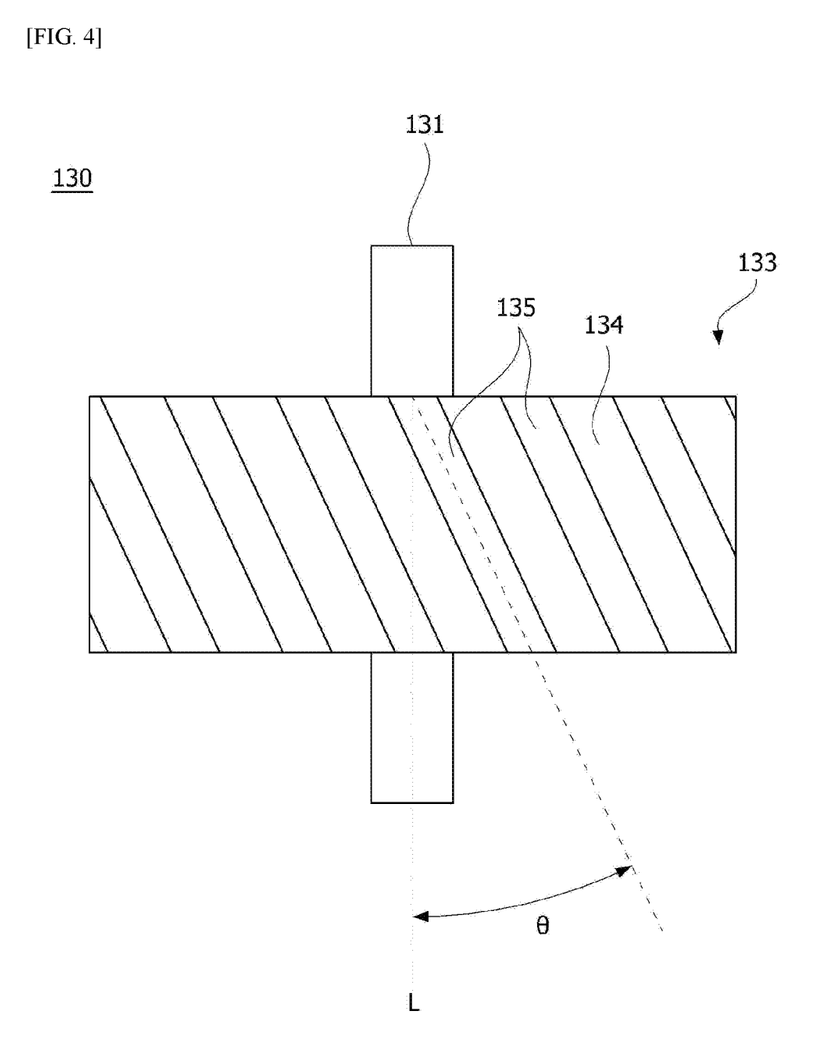
FIG. 4 is a side view illustrating the first gear part according to the first embodiment.
Figure 5:
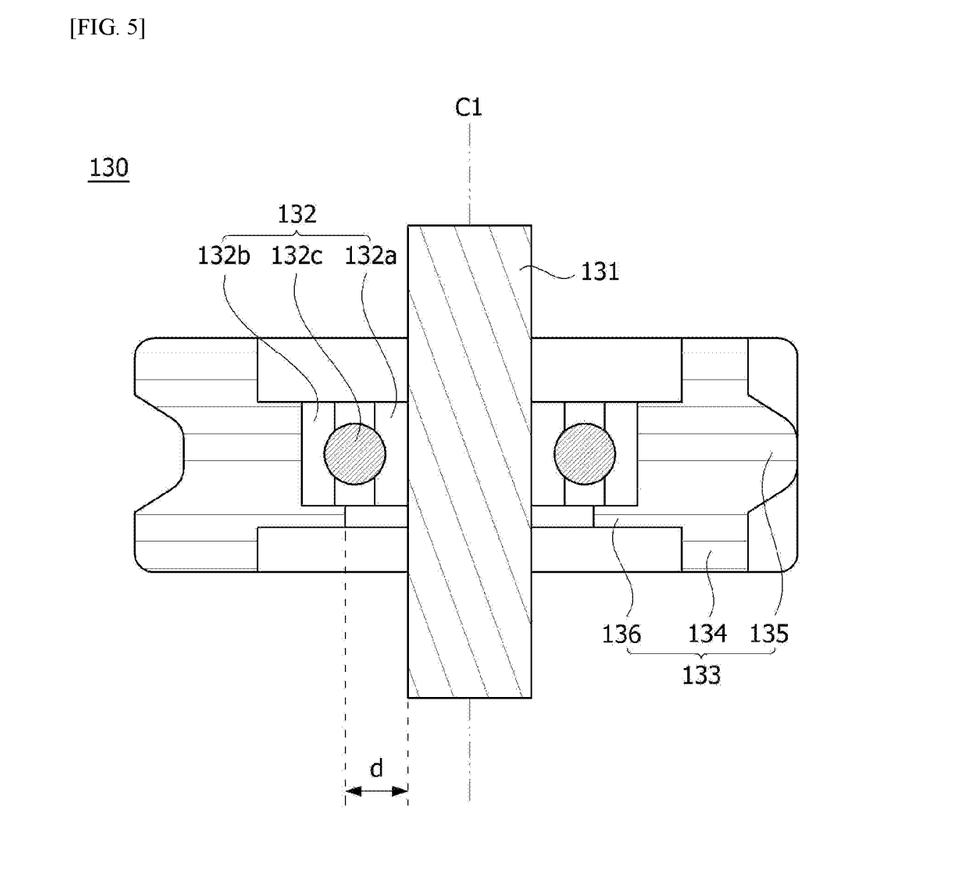
FIG. 5 is a cross-sectional view taken along line A-A of FIG. 3b.

FIG. 3 is a view illustrating a first gear part disposed in the actuator according to a first embodiment, FIG. 4 is a side view illustrating the first gear part according to the first embodiment, and FIG. 5 is a cross-sectional view taken along line A-A of FIG. 3B. Here, FIG. 3A is a view illustrating a relationship in which a bearing having a first shaft disposed at a center of the bearing is disposed in a first gear, and FIG. 3B is a perspective view illustrating the first gear part according to the first embodiment.

Referring to FIGS. 3 to 5, the first gear part 130 according to the first embodiment may include a first shaft 131, a bearing 132, and a first gear 133 according to the first embodiment.

The first shaft 131 may be formed to have a cylindrical shape.

One side of the first shaft 131 may be supported by the housing 110 and the other side thereof may be supported by the cover 120. In this case, the first shaft 131 may be rotatably disposed between the housing 110 and the cover 120. However, the first shaft 131 is not necessarily limited thereto.

For example, one side of the first shaft 131 may be coupled to the housing 110 through a press-fitting method and the cover 120 may be press-fitted to the other side of the first shaft 131 to fix a shaft of the first gear part 130.

Accordingly, the gap G may be minimally formed so that noise quality can be improved. In addition, in a case in which the first shaft 131 is fixed between the housing 110 and the cover 120, vibration due to rotation of the first gear 133 may be minimized. In addition, since the first shaft 131 is disposed between the housing 110 and the cover 120 through the press-fitting method, even when the first gear 133 rotates, axial misalignment can be prevented. Accordingly, axial alignment of the first gear part 130 disposed in the gearbox 100 can be improved.

The bearing 132 may be disposed outside the first shaft 131.

The bearing 132 may be disposed between an outer circumferential surface of the first shaft 131 and an inner circumferential surface of the first gear 133. In this case, the bearing 132 may be fixed to the outer circumferential surface of the first shaft 131 through a press-fitting method.

Referring to FIG. 5, the bearing 132 may include an inner wheel 132a disposed outside the first shaft 131, an outer wheel 132b disposed inside the first gear 133, and a ball 132c disposed between the inner wheel 132a and the outer wheel 132b.

Accordingly, the inner wheel 132a may be disposed on the outer circumferential surface of the first shaft 131, and the outer wheel 132b may be disposed on the inner circumferential surface of the first gear 133.

Accordingly, the bearing 132 causes the first gear 133 to be rotatable about the first shaft 131 and causes the first shaft 131 to also be disposed in the housing 110 and the cover 120 through the press-fitting method. That is, the bearing 132 causes the first shaft 131 to be fixed so that axial misalignment of the first shaft 131 is prevented and causes the first gear 133 to be rotatable.

The first gear 133 may be disposed around the first shaft 131 to be rotatable due to the bearing 132. Accordingly, the first gear 133 may rotate with respect to a first axis C1 passing through a center of the first shaft 131.

The first gear 133 may be disposed outside the bearing 132. Specifically, the first gear 133 may be disposed on an outer circumferential surface of the bearing 132.

In this case, the bearing 132 may be coupled to the inner circumferential surface of the first gear 133 through a press-fitting method. As illustrated in FIG. 3A, the bearing 132 with the first shaft 131 that is disposed at a center of the bearing 132 may be disposed in the first gear 133 through the press-fitting method. In this case, the bearing 132 with the first shaft 131 that is disposed at the center of the bearing 132 may be referred to as a bearing assembly. Accordingly, the first shaft 131 and the bearing 132 may be used to form the bearing assembly, and the bearing assembly may be disposed in the first gear 133 through the press-fitting method to form the first gear part 130.

As illustrated in FIGS. 3 to 5, the first gear 133 may include a main body 134, first gear teeth 135, and a first protrusion 136. In this case, the first gear 133 may be formed of a synthetic resin material such as plastic. Accordingly, the main body 134, the first gear teeth 135, and the first protrusion 136 may be integrally formed.

The main body 134 may be formed to have a ring shape or cylindrical shape. In addition, the bearing 132 may be coupled to an inner circumferential surface of the main body 134 through a press-fitting method.

The plurality of first gear teeth 135 may be formed on an outer circumferential surface of the main body 134.

As illustrated in FIG. 4, the first gear teeth 135 may be disposed to be inclined at a predetermined angle θ with respect to a virtual line L vertically passing through the outer circumferential surface of the main body 134. In this case, the line L may be parallel to the first axis C1.

In addition, the gear teeth of the second gear part 140 and the third gear part 150 may be formed to correspond to the first gear teeth 135 so as to engage therewith. For example, the gear teeth of the second gear part 140 and the third gear part 150 may also be formed to be inclined at the predetermined angle θ.

The first protrusion 136 may be formed to protrude inward from the inner circumferential surface of the main body 134. In this case, the term "inward" refers to a direction toward the first shaft 131 from the main body 134. In addition, one region of the bearing 132 may be disposed on the first protrusion 136.

As illustrated in FIGS. 3A and 5, the first protrusion 136 may be formed to protrude from a lower side of the inner circumferential surface of the main body 134. In addition, an end portion of the first protrusion 136 may be disposed to be spaced a predetermined distance d from the outer circumferential surface of the first shaft 131.

When the bearing 132 is disposed, the outer wheel 132b of the bearing 132 may be seated on the first protrusion 136.

Accordingly, since the first protrusion 136 of the first gear part 130 supports only the outer wheel 132b of the bearing 132, only the first gear 133 is rotatable.

Meanwhile, a force may be applied to the first gear 133 in an upward direction due to a thrust generated due to rotation of the second gear part 14. Accordingly, a step difference (a height difference) may occur between a second gear 142 of the second gear part 140 and the first gear 133.

However, since the first protrusion 136 of the first gear 133 is supported by the outer wheel 132b, occurrence of the height difference can be prevented. Accordingly, the first protrusion 136 can increase a durability lifespan of the gearbox 100 and also prevent noise so that quality of the actuator 1 can be improved.

Figure 6A:
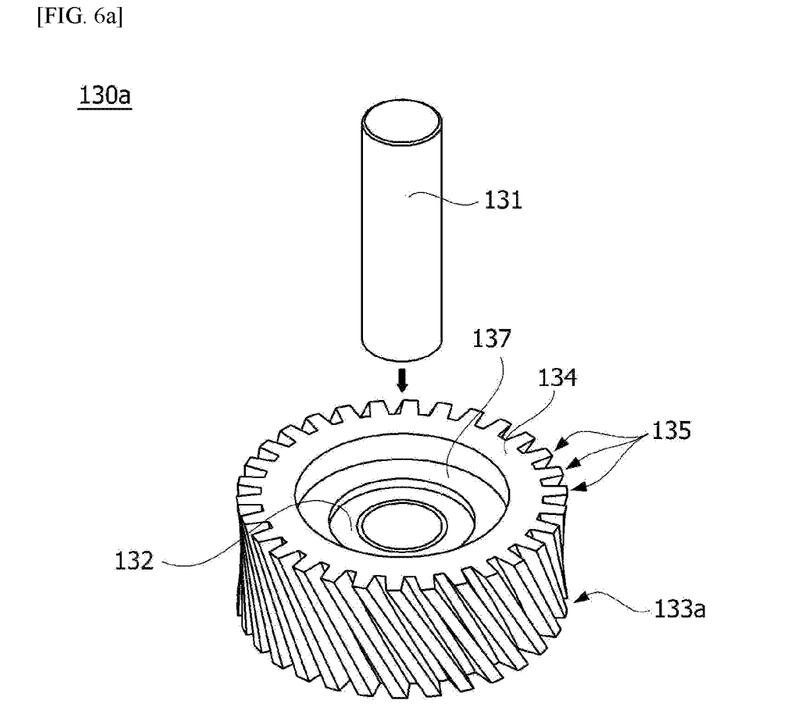
FIG. 6a is an exploded perspective view illustrating a first gear part disposed in the actuator according to a second embodiment.
Figure 6B:
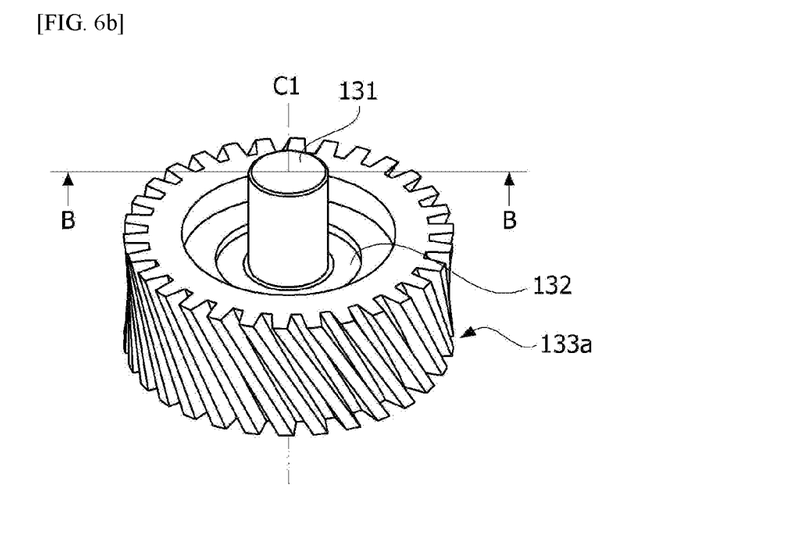
FIG. 6b is a perspective view illustrating the first gear part according to the second embodiment.
Figure 7:
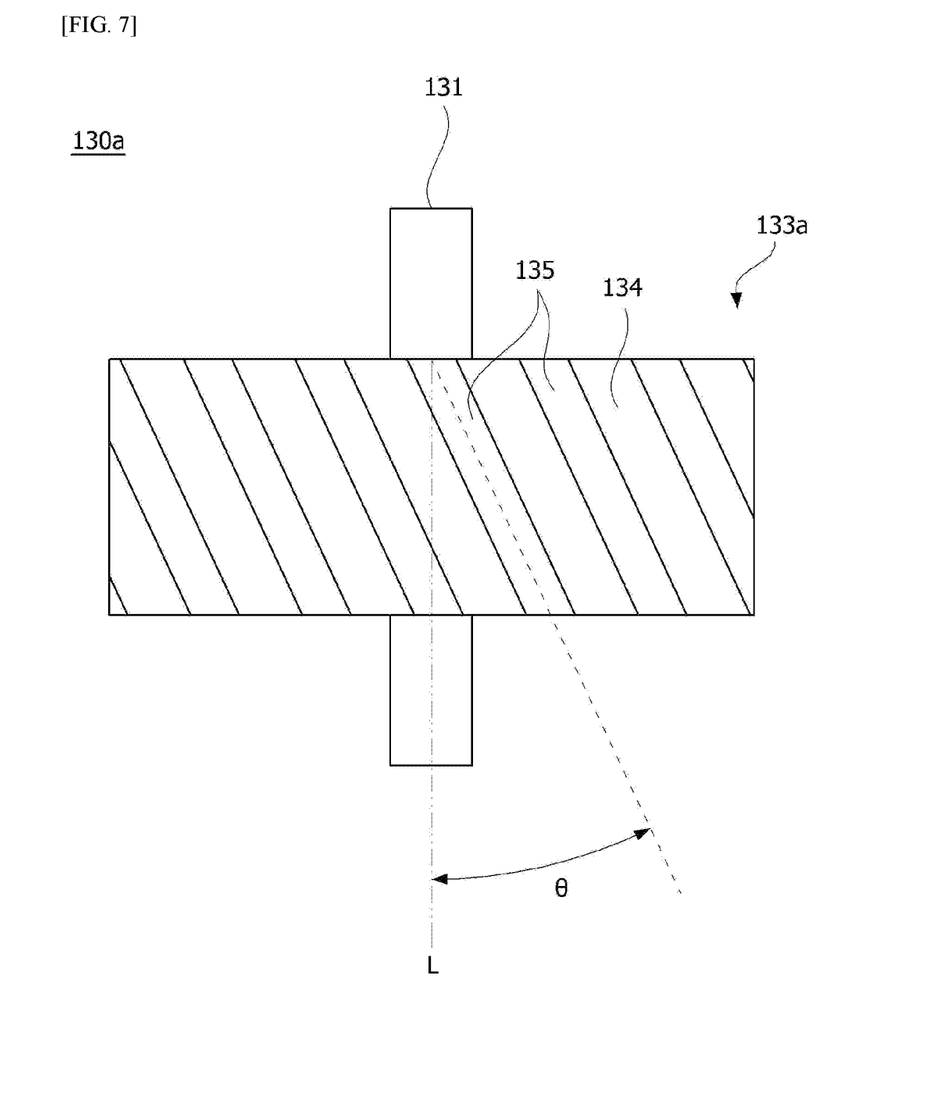
FIG. 7 is a side view illustrating the first gear part according to the second embodiment.
Figure 8:
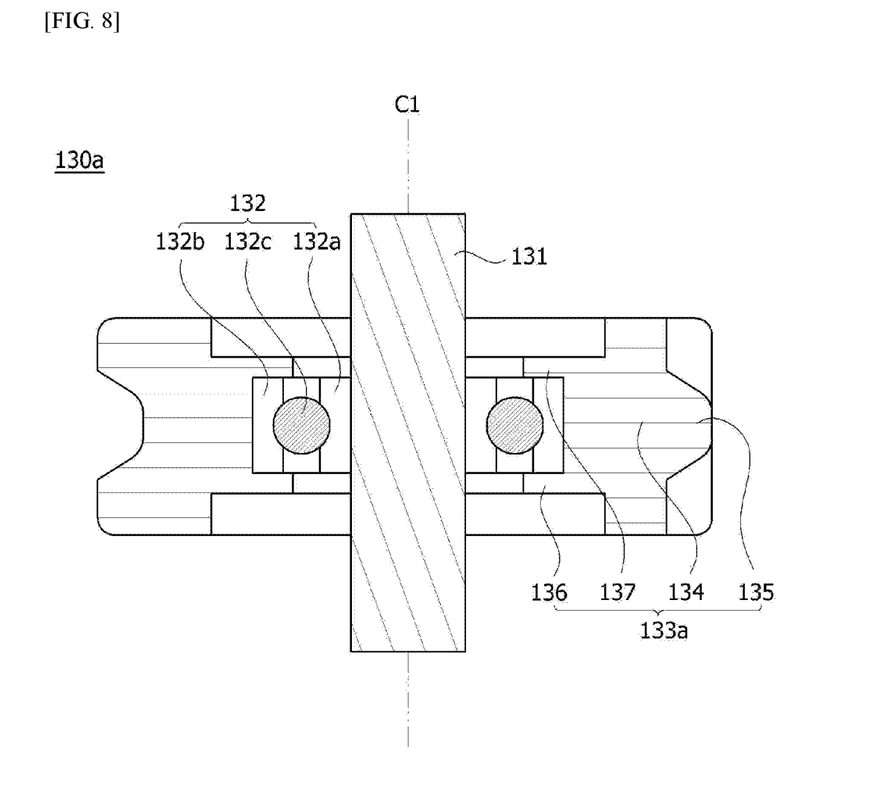
FIG. 8 is a cross-sectional view taken along line B-B of FIG. 6b.

FIG. 6 is a view illustrating a first gear part disposed in the actuator according to a second embodiment, FIG. 7 is a side view illustrating the first gear part according to the second embodiment, and FIG. 8 is a cross-sectional view taken along line B-B of FIG. 6B. Here, FIG. 6A is a view illustrating a relationship in which a first shaft is disposed in a bearing disposed inside the first gear, and FIG. 6B is a perspective view illustrating a first gear part according to the second embodiment.

The first gear part 130a according to the second embodiment may be disposed in the actuator 1 instead of the first gear part 130 according to the first embodiment.

Hereinafter, when the first gear part 130a according to the second embodiment is described, since components which are the same as the components of the first gear part 130 according to the first embodiment have the same reference symbols as the components of the first gear part 130, the specific descriptions thereof will be omitted.

Referring to FIGS. 6 to 8, when the first gear part 130a according to the second embodiment is compared to the first gear part 130 according to the first embodiment, there are differences in that the first gear part 130a according to the second embodiment further includes a second protrusion 137 and the first gear part 130a is formed through a different method.

Referring to FIGS. 6 to 8, the first gear part 130a according to the second embodiment may include a first shaft 131, a bearing 132, and a first gear 133a according to the second embodiment. In this case, the first gear 133a may include a main body 134, first gear teeth 135, a first protrusion 136, and a second protrusion 137. In addition, the first gear 133a may be formed of a synthetic resin material such as plastic. Accordingly, the main body 134, the first gear teeth 135, the first protrusion 136, and the second protrusion 137 may be integrally formed.

Referring to FIG. 6A, the first shaft 131 may be disposed in the bearing 132 disposed inside the first gear 133a according to the second embodiment. In this case, the bearing 132 and the first gear 133a may be formed through an insert injection method and may be referred to as a gear assembly.

Accordingly, the first shaft 131 may be disposed in the bearing 132 of the gear assembly through a press-fitting method.

That is, the bearing 132 and the first gear 133a coupled through the insert injection method may be used to form the gear assembly, and the bearing 132 of the gear assembly may be coupled to the first shaft 131 through a press-fitting method to form the first gear part 130.

The bearing 132 may be disposed between an outer circumferential surface of the first shaft 131 and an inner circumferential surface of the first gear 133a. In this case, the bearing 132 may be fixed to the inner circumferential surface of the first gear 133a through the insert injection method. In this case, the first gear 133a may be rotatably disposed on an outer circumferential surface of the bearing 132.

The first protrusion 136 and the second protrusion 137 may protrude inward from an inner circumferential surface of the main body 134 to be spaced apart from each other. In this case, the first protrusion 136 and the second protrusion 137 may be disposed to be spaced apart from each other in an axial direction. In addition, one region of the bearing 132 may be disposed between the first protrusion 136 and the second protrusion 137.

As illustrated in FIG. 8, an outer wheel 132b of the bearing 132 may be disposed between the first protrusion 136 and the second protrusion 137. That is, the first protrusion 136 may be disposed below the outer wheel 132b and the second protrusion 137 may be disposed above the outer wheel 132b. Accordingly, forces of the first protrusion 136 and the second protrusion 137 to be fixed to the bearing 132 can be increased.

In this case, since the first protrusion 136 and the second protrusion 137 of the first gear part 130a support only the outer wheel 132b of the bearing 132, only the first gear 133a is rotatable.

Meanwhile, a force may also be applied to the first gear 133a in a downward direction due to a thrust generated due to rotation of the second gear part 140. Accordingly, a step difference (a height difference) may occur between the second gear 142 of the second gear part 140 and the first gear 133a.

However, since the second protrusion 137 of the first gear 133a is supported by the outer wheel 132b, occurrence of the step difference can be prevented. For example, since the bearing 132 has been coupled to the first shaft 131, the second protrusion 137 of the first gear 133a may be supported by the outer wheel 132b. Accordingly, the second protrusion 137 may improve a durability lifespan of the gearbox 100 and also prevent noise to improve quality of the actuator 1.

The second gear part 140 may be rotated by the motor 200. In this case, the second gear part 140 may be provided as a pinion gear.

Referring to FIG. 2, the second gear part 140 may include a second shaft 141 and the second gear 142. In addition, the second gear part 140 may be rotatably disposed between the housing 110 and the cover 120.

Gear teeth formed on the second gear 142 are engaged with the first gear teeth 135 of the first gear 133 or 133a. Accordingly, in a case in which the first gear teeth 135 of the first gear 133 or 133a is formed at the predetermined angle θ, the gear teeth formed on the second gear 142 may also be formed to be inclined. The third gear part 150 may include a third shaft 151 and a third gear 152.

In addition, the third gear part 150 may be rotatably disposed between the housing 110 and the cover 120. Accordingly, the third gear part 150 may be rotated by operating in conjunction with the first gear 133 or 133a. In this case, the third gear part 150 may be provided as a final gear.

Gear teeth formed on the third gear 152 are engaged with the first gear teeth 135 of the first gear 133 or 133a. Accordingly, in a case in which the first gear teeth 135 of the first gear 133 or 133a are formed at the predetermined angle θ, the gear teeth formed on the third gear 152 may also be formed to be inclined.

Meanwhile, a first axis C1 of the first shaft 131, a second axis C2 of the second shaft 141, and a third axis C3 of the third shaft 151 may be disposed to be parallel to each other.

The motor 200 rotates the second gear part 140. In this case, a direct current (DC) motor may be used as the motor 200.

In addition, while the present invention has been described above with reference to the embodiments, it will be understood by those skilled in the art that various modifications and applications may be made within a range without departing from the spirit and features of the present invention defined by the appended claims of the present invention. In addition, it should be understood that differences related to modifications and applications fall within the scope of the present invention defined by the appended claims.

The invention claimed is:

1. A gearbox comprising:
a housing in which an opening is formed;
a cover disposed on the opening;
a first gear part of which a first side is supported by the housing and a second side is supported by the cover; and
a second gear part and a third gear part with the first gear part disposed therebetween,
wherein the first gear part includes:
a first shaft of which a first side is supported by the housing and a second side is supported by the cover;
a bearing disposed at an outer circumferential surface of the first shaft, the bearing including:
an inner wheel disposed on the outer circumferential surface of the first shaft;
an outer wheel; and
a ball disposed between the inner wheel and the outer wheel; and
a first gear disposed outside the bearing, the first gear including:
a main body; and
a first protrusion protruding from an inner circumferential surface of the main body such that an innermost diameter of the first protrusion is less than an innermost diameter of the outer wheel of the bearing, the first protrusion supporting the outer wheel of the bearing, and
wherein the first shaft is fixed to prevent rotation of the first shaft between the housing and the cover.

2. The gearbox of claim 1, wherein the first gear further includes first gear teeth formed on an outer circumferential surface of the main body.

3. The gearbox of claim 2, wherein the outer wheel is disposed inside the first gear such that the first protrusion is disposed below the outer wheel.

4. The gearbox of claim 3, wherein the bearing is coupled to the inner circumferential surface of the main body through a press-fitting method.

5. A gearbox comprising:
a housing in which an opening is formed;
a cover disposed on the opening;
a first gear part of which a first side is supported by the housing and a second side is supported by the cover; and
a second gear part and a third gear part with the first gear part disposed therebetween,
wherein the first gear part includes:
a first shaft of which a first side is supported by the housing and a second side is supported by the cover;
a bearing disposed at an outer circumferential surface of the first shaft, the bearing including:
an inner wheel disposed on the outer circumferential surface of the first shaft;
an outer wheel; and
a ball disposed between the inner wheel and the outer wheel; and
a first gear disposed outside the bearing, the first gear including:
a main body;
a first protrusion protruding from an inner circumferential surface of the main body such that an innermost diameter of the first protrusion is less than an innermost diameter of the outer wheel of the bearing, the first protrusion supporting the outer wheel of the bearing, and the first protrusion of the first gear is a first annular ring; and
a second annular ring spaced apart from the first annular ring, and
wherein the outer wheel of the bearing is disposed between the first annular ring and the second annular ring.

6. The gearbox of claim 5,
wherein the first annular ring is disposed below the outer wheel, and
wherein the second annular ring is disposed above the outer wheel.

7. The gearbox of claim 6, wherein the bearing is disposed in the first gear through an insert injection method.

8. An actuator comprising:
a gearbox; and
a motor disposed at a first side of the gearbox,
wherein the gearbox includes:
a housing in which an opening is formed;
a cover disposed on the opening;
a first gear part of which a first side is supported by the housing and a second side is supported by the cover, and
a second gear part and a third gear part with the first gear part disposed therebetween,
wherein the first gear part includes:
a first shaft of which a first side is supported by the housing and a second side is supported by the cover;
a bearing disposed outside the first shaft, the bearing including:

an inner wheel disposed on an outer circumferential surface of the first shaft;

an outer wheel; and a ball disposed between the inner wheel and the outer wheel; and a first gear disposed outside the bearing, the first gear including:

a main body; and a first protrusion protruding from an inner circumferential surface of the main body such that an innermost diameter of the first protrusion is less than an innermost diameter of the outer wheel of the bearing, the first protrusion supporting the outer wheel of the bearing, wherein, when the second gear part is rotated by the motor, the first gear part and the third gear part rotate by operating in conjunction with the second gear part, and wherein the first shaft is fixed to prevent rotation of the first shaft between the housing and the cover.

9. The actuator of claim 8, wherein the first gear further includes first gear teeth formed on an outer circumferential surface of the main body.

10. The actuator of claim 9, wherein:

the first shaft and the bearing are used to form a bearing assembly; and the first gear is disposed in the bearing assembly through a press-fitting method to form the first gear part.

11. The actuator of claim 8, wherein the first protrusion of the first gear is a first annular ring, and wherein the first gear further includes a second annular ring spaced apart from the first annular ring, and wherein the outer wheel of the bearing is disposed between the first annular ring and the second annular ring.

12. The actuator of claim 11, wherein:

the bearing and the first gear are formed as a gear assembly through an insert injection method; and the first shaft is coupled to the bearing of the gear assembly through a press-fitting method to form the first gear part.

* * * * *